Patented Apr. 10, 1951

2,548,588

UNITED STATES PATENT OFFICE 2,548,588

METHOD OF PREPARING LOW SPECIFIC GRAVITY LIGHT COLORED TANNIN

Gino Carrara, Milan, Italy

No Drawing. Application January 7, 1949, Serial No. 69,820. In Italy November 26, 1948

1 Claim. (Cl. 260—473.6)

The invention relates to the recovery of a low specific gravity tannin.

Ether extracted tannic acid is a type of pure tannic acid having valuable properties with regard to light weight and solubility; it is used for the clarification of high-grade wines, in the manufacture of synthetic dyestuffs, inks, mordants for dyeing, etc.

The raw material generally employed for this manufacture is the Chinese gall-nut and particularly the wood-like excrescence formed on the leaves of Rhus semialata, a plant widely known in China, Japan and the Northern Indies, when stung by an insect called "Aphis chinensis."

The gall-nut is a raw stuff, which is well suited for this manufacture, because it contains about 75-80% tannin, about 4-5% of other tannin agents and only a small percentage of impurities.

The method of producing tannin from this raw material by extraction with ether did not offer particular difficulties; the method consisted essentially in a preliminary extraction of the nut with water to produce a watery extract, from which the tannin was extracted by means of an alcohol and ether mixtures. This extract was thereupon concentrated and dried on rotary drying cylinders.

The final product was light yellow in color, had a specific gravity of about 0.2 and contained about 87-90% tannin, the rest being non-tannin materials and water. The color test carried out by means of a Lovibond colorimeter with a 5% aqueous solution showed as an average 0.2-0.3 yellow points.

Applicant succeeded, upon the basis of intense investigations to produce a tannin having approximately the same properties by utilizing certain raw materials and particularly Quebracho, wood (Aspidosperma, Acacia, Schinopsis, Quebrachia)
Gambir, leaves (Catechu pallidum)
Mimosa, bark (Various genera of Acacia)
Myrobalan, fruit (Terminalia chebula, citrica and bellerica)
Divi-divi, pods (Caesalpinia coriaria)
Algarrobilla, berries (Caesalpinia brevifolia)

Experiments made with these initial materials, however, proved that aqueous extracts of these materials were unsuitable for the conventional treatment with an alcohol-ether mixture and entirely different from the aqueous extract of the Chinese gall-nut.

It was, however, ascertained that extraction of tannin from the aqueous liquid could be effected by means of ethyl acetate according to the well-known direction of Löwe (Löwe—Die Chemie der natürlichen Gerbstoffe—Chemistry of Natural Tanning Agents). The extract obtained by treating the total watery extract of the mentioned materials with ethyl acetate could not be properly dried, as it became caramelled on the revolving heating drying cylinders and melted instead of drying, giving rise to a light spongy mass.

The difficulty was solved by modifying the method of the aqueous extraction of the said materials; for this purpose, a fractional aqueous extraction and a subsequent extraction with ethyl acetate proved successful.

A preferred manner of carrying out this process is as follows.

The pulverized rawstuff is extracted by water at a temperature not exceeding 50° C. Extraction is carried out by percolation until 50-55% of the tannin contained in the rawstuff is removed therefrom. The resulting liquors are subjected to preliminary concentration to about 10-12° Bé., cooled to about 0° and maintained at this temperature for several days.

The extracts are thereupon clarified in a decantation centrifuge, and the resulting clear liquor is again concentrated to about 28-30° Bé. The extract contains about 27-28% tannin and 22-24% non-tannin stuffs.

Only this extract is suitable for further handling, while an extract obtained by thorough extraction of the raw material, after this has been partly extracted by water in a battery in counter-current, and containing approximately 40% of the total tannin present in the rawstuff, cannot be used in the manufacture of ether-extracted tannin.

The first mentioned extract is subsequently extracted by ethyl acetate in a stirrer provided apparatus.

The ethyl acetate extract is concentrated in a vacuum concentrator, the solvent being recovered. The concentrated extract, containing not more than 25-30% ethyl acetate, is directly transported to the driving cylinders, where it is dried at a temperature of about 120° at atmospheric pressure. The resulting product undergoes a so-called ageing, by placing it in a relatively thin layer on slabs in a slightly moist atmosphere whereby it reabsorbs a certain quantity of moisture, of for instance about 8-10%.

The final product obtained is of particularly light weight, has a specific gravity of 0.1-0.12 and its composition is similar to that of gall-nut tannin, namely 86-88% tannin, 3.4% non-tannin stuffs, 9-10% water.

It distinguishes from gall-nut tannin through a slight difference in color, due to the presence of xantophyl contained in the initial products.

The resulting products have been found most satisfactory for the above mentioned purposes, for which tannin extracted by ether from the gall-nut had heretofore been exclusively employed.

The tannin output corresponds to about 75% of the tannin stuffs originally contained in the special extract from the above mentioned drugs.

Since certain changes in carrying out the above process could be made without departing from the scope thereof, it is intended that all matter contained in the above description shall be interpreted as illustrative and not in a limiting sense.

Having thus described the invention, what I claim as new and desire to be secured by Letters Patent, is as follows:

In a method for the recovery of a low specific gravity light-colored tannin from a member of the group consisting of quebracho wood, gambir leaves, mimosa bark, myrobalan fruit, divi-divi pods, and algarrobilla berries the steps of pulverizing the tannin containing material, charging the pulverized material into a vessel, percolating water through the charge, continuing the water percolation until 50 to 55 per cent of the tannin present in the charge is dissolved and an aqueous tannin solution is produced, concentrating the said solution to about 10 to 12° Bé., cooling the same to about 0° C., maintaining the solution for several days at this temperature, concentrating the same to about 20 to 30° Bé. and thereupon subjecting the solution to an extraction with ethyl acetate.

GINO CARRARA.

REFERENCES CITED

The following references are of record in the file of this patent:

UNITED STATES PATENTS

| Number | Name | Date |
|---|---|---|
| 517,626 | Reinus | Apr. 3, 1894 |
| 531,752 | Schweitzer | Jan. 1, 1895 |
| 1,078,893 | Allen | Nov. 18, 1913 |